(12) United States Patent
Han et al.

(10) Patent No.: US 9,620,013 B2
(45) Date of Patent: Apr. 11, 2017

(54) APPARATUS FOR DETERMINING LANE POSITION THROUGH INTER-VEHICLE COMMUNICATION

(71) Applicant: KYUNGPOOK NATIONAL UNIVERSITY INDUSTRY-ACADEMIC COOPERATION FOUNDATION, Daegu (KR)

(72) Inventors: Dong Seog Han, Daegu (KR); Kwang Hee Lee, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 35 days.

(21) Appl. No.: 14/442,682

(22) PCT Filed: Nov. 21, 2012

(86) PCT No.: PCT/KR2012/009846
§ 371 (c)(1),
(2) Date: Aug. 7, 2015

(87) PCT Pub. No.: WO2014/077442
PCT Pub. Date: May 22, 2014

(65) Prior Publication Data
US 2015/0339927 A1 Nov. 26, 2015

(30) Foreign Application Priority Data
Nov. 13, 2012 (KR) .......................... 10-2012-0128430

(51) Int. Cl.
*B60T 7/12* (2006.01)
*G08G 1/16* (2006.01)
(Continued)

(52) U.S. Cl.
CPC ............... *G08G 1/161* (2013.01); *B60R 1/00* (2013.01); *B60W 40/10* (2013.01); *G08G 1/166* (2013.01);
(Continued)

(58) Field of Classification Search
CPC ..... G08G 1/00; G08G 1/16; G08G 1/166; G08G 1/167; B60R 1/00; B60R 2300/804
(Continued)

(56) References Cited

U.S. PATENT DOCUMENTS

| 2013/0050491 A1* | 2/2013 | Lin ..................... G08G 1/0962 348/148 |
| 2013/0063599 A1* | 3/2013 | Imai ................... G06K 9/00798 348/148 |
| 2014/0032100 A1* | 1/2014 | Park ....................... G01C 21/30 701/446 |

FOREIGN PATENT DOCUMENTS

| JP | 2009-042834 A | 2/2009 |
| JP | 2009042834 A * | 2/2009 |

(Continued)

*Primary Examiner* — Thomas G Black
*Assistant Examiner* — Luke Huynh
(74) *Attorney, Agent, or Firm* — Porzio, Bromberg & Newman, P.C

(57) ABSTRACT

The present disclosure relates to an apparatus for determining lane position of vehicle through inter-vehicle communication, and more particularly an apparatus that determines lane location that personal vehicle is currently driving through using a lane information transferred from surrounding vehicles.

11 Claims, 3 Drawing Sheets

(51) Int. Cl.
*B60R 1/00* (2006.01)
*B60W 40/10* (2012.01)
*B60W 30/12* (2006.01)

(52) U.S. Cl.
CPC ........ *G08G 1/167* (2013.01); *B60R 2300/804* (2013.01); *B60W 30/12* (2013.01); *B60W 2540/18* (2013.01); *B60W 2550/408* (2013.01)

(58) Field of Classification Search
USPC ........... 701/1, 23, 24, 28, 96, 116, 117, 446; 348/135, 142, 148, 149
See application file for complete search history.

(56) References Cited

FOREIGN PATENT DOCUMENTS

| | | | |
|---|---|---|---|
| JP | 4366419 B2 | | 11/2009 |
| JP | 2010211712 A | | 9/2010 |
| KR | 10-2011-0023952 A | | 3/2011 |
| KR | 20110023952 A | * | 3/2011 |
| KR | 10-1085835 B1 | | 11/2011 |

* cited by examiner

APPARATUS FOR DETERMINING LANE POSITION THROUGH INTER-VEHICLE COMMUNICATION

TECHNICAL FIELD

The present disclosure relates to an apparatus for determining lane position of vehicle through inter-vehicle communication, and more particularly an apparatus that determines lane location that personal vehicle is currently driving through using lane information transferred from surrounding vehicles.

BACKGROUND

In a driver support system of a related art, a vehicle driver had various functions that support operation of driving. In most cases, the purpose of such system is to improve transportation safety by avoiding dangerous situation that may cause accidents. Other purposes are improving convenience by relieving the driver's burden and the driver can operate driving easier through surrounding information that is properly transmitted by managing according to the environment. Such system with lane recognition function is well known.

In most methods of lane recognition, measures the surrounding of front, side or back of a vehicle then extracts lane information from the image data by determining the recorded image data, thereby recognizes relative recognition of personal vehicle of the lane. The lane information alerts speeding and lane departure in a driver support system or can be used for vehicle brake or keeping the lane through control in a longitudinal direction and transverse direction.

However, in a related art a driver support system that notice which lane that a current driver is driving is not particularly suggested. Accordingly, when a destination is different according to each road relating to a specific road, i.e. lane 1 is left side direction, lanes 2 to 5 are straight direction and lane 6 is right direction, there is a problem a driver may manually have to confirm the related lane according to a driving direction.

SUMMARY OF INVENTION

Solution to Problem

In an effort to solve the above problem the present description discloses lane location determination apparatus that can determine a lane location that a current personal vehicle is driving using information received from a surrounding vehicle without a driver directly determining the lane location.

Particularly, the present description provides a lane location determining apparatus that can accurately determine a lane location by determining a lane location according to a vehicle that is near a centerline.

Technical Solutions

A lane location determining apparatus according to an embodiment of the present description comprises a receiver configured on both sides of a personal vehicle to receive a first lane information and a second information from the left and right side lane of the personal vehicle; a vehicle location determining unit configured to determine a lane location of the personal vehicle using at least one of the first lane and second lane information.

Preferably, the receiver comprises a first receiver configured on the left side of the personal vehicle to receive a first lane information from the first vehicle that is located on the left side lane of the personal vehicle, and a second receiver configured on a right side of the personal vehicle to receive a second lane information from a second vehicle that is located on a right side lane of the personal vehicle.

Herein, the lane location determining unit may determine a lane location in that when a first lane information is received through the first receiver, the personal vehicle is located on a right side lane of the first lane information and when a second lane information is received through the second receiver, the personal vehicle is located on a left side lane of the second lane information.

Further, the lane location determining unit may determine that the personal vehicle is located on a right side lane of the first lane information when the lane locations of the personal vehicle that are determined using the first lane information and the second lane information are inconsistent therebetween.

According to an embodiment of the present description, the lane location determining unit may further comprise a first transmitter configured on the left side of the personal vehicle and transmits a lane information of the personal vehicle to a third vehicle located on a left side lane of the personal vehicle and a second transmitter configured on a right side of the personal vehicle to transmit a lane information of the personal vehicle to a right side lane of the personal vehicle.

Herein, the lane location determining unit may determine the personal vehicle is located on a left side or right side lane of previous lane information when determined that the lane is moved to a left side or right side lane using steering information of the personal vehicle.

Further, the first and second receiver and the first and second transmitter may receive or transmit related lane information through a short communication method including an infrared ray communication method and a Bluetooth® communication method.

According to an embodiment of the present description, the lane location determining apparatus further includes a centerline detector configured to detect a centerline using a lane detecting sensor, and the lane location determining unit may determine that the personal vehicle is located on a first lane additionally using the centerline detecting information.

Preferably, a second transmitter configured on a right side of the personal vehicle transmits lane information of the personal vehicle to a fifth vehicle that is located on a right side vehicle of the personal vehicle when a centerline is detected through the centerline detector.

Further, the centerline detecting unit can detect a left side lane of the personal vehicle.

Preferably, the centerline detecting unit may detect the center line through whether a left side lane of the personal vehicle is yellow for over a predetermined time.

Further, the lane detecting sensor is applied with a camera sensor and the centerline detecting unit can detect the centerline through an image management of image information that is collected using the camera sensor.

Effects of Invention

The lane location determining apparatus according to an embodiment of the present description can accurately determine the lane location of a current personal vehicle is driving by receiving lane information from the surrounding vehicle using a short communication method including an infrared ray communication method and a Bluetooth® communication method.

Specifically, an accurate location maybe determined through determining a lane location of surrounding vehicle in reference to the vehicle when detecting a centerline using a specific lane detecting sensor.

METHOD FOR CARRYING OUT THE INVENTION

Figure 1:
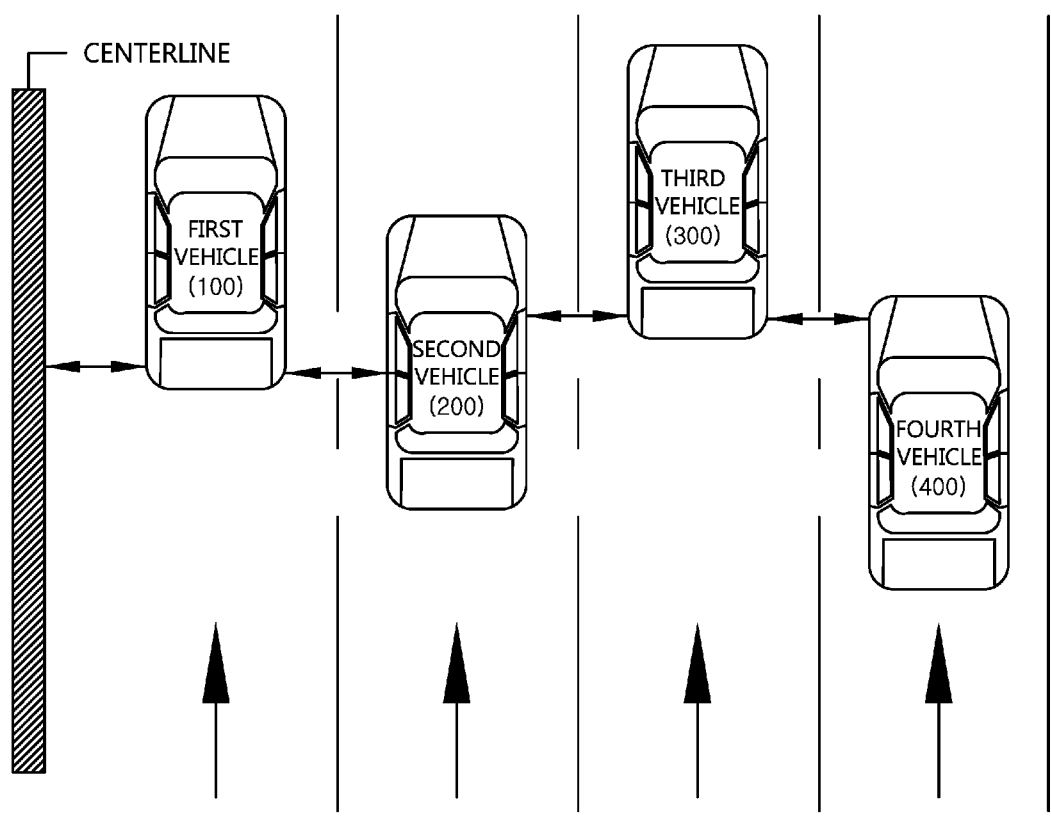
FIG. 1 is a block diagram illustrating transmitting and receiving lane location information among each vehicles on the road according to an embodiment of the present description.

Certain exemplary embodiments of the present inventive concept will now be described in greater detail with reference to the accompanying drawings. In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

While the expressions such as "first" or "second" can be used to refer to various elements, the elements are not limited by the expressions. The expressions are used only for the purpose of distinguishing one element from the other.

The expressions are used herein only for the purpose of explaining specific embodiments and not to limit the present disclosure. An expression in singular form encompasses plural meaning, unless otherwise specified. Throughout the description, the expression "comprise" or "have" is used only to designate the existence of characteristic, number, step, operation, element, component or a combination thereof which are described herein, but not to preclude possibility of existence of one or more of the other characteristics, numbers, steps, operations, elements, components or combinations of these or addition.

Hereinafter, an embodiment of the present disclosure is described in detail referring to the attached drawings.

FIG. 1 is a block diagram illustrating transmitting and receiving lane location information among each vehicle on the road according to an embodiment of the present description.

As illustrated in FIG. 1, lane information of each vehicle may transmit and receive a current lane information of a personal vehicle to inter-vehicle located on a specific road and a current lane information of a personal vehicle may be determined using a lane information that is received from the other vehicle.

For example, a third vehicle 300 located on a third lane according to a center lane may determine a lane location the third vehicle 300 is driving using respective lane information received from the second vehicle 200 and a fourth vehicle 400. Further, the third vehicle 300 can transmit its lane information to a second vehicle 200 or a fourth vehicle 400. The embodiment is illustrated in FIG. 2 hereinafter.

Figure 2:
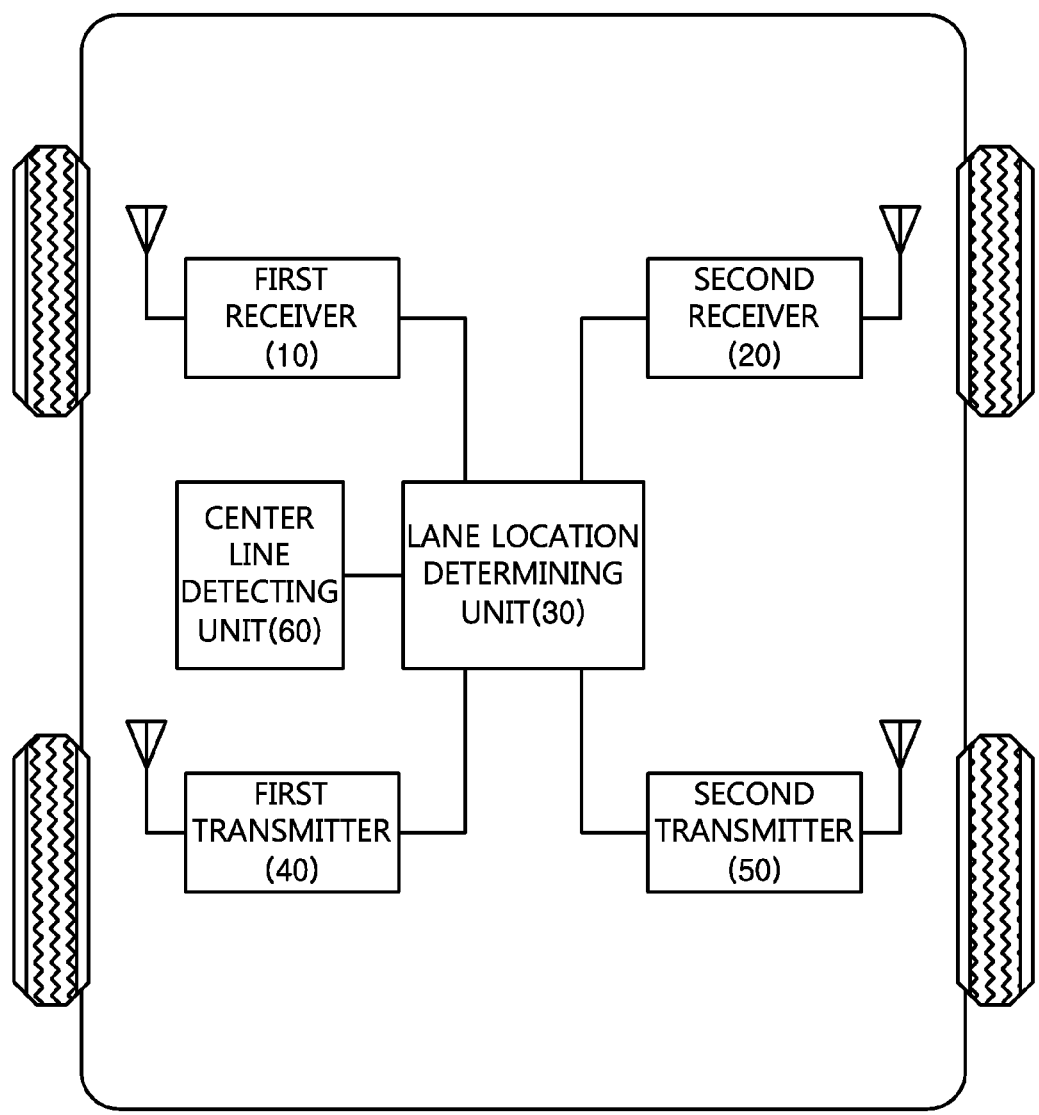
FIG. 2 is a diagram illustrating a lane location determining apparatus according to an embodiment of the present description.

FIG. 2 is a diagram illustrating a lane location determining apparatus according to an embodiment of the present description.

As illustrated in FIG. 2, a lane location determining apparatus according to an embodiment of the present description comprises a receiver configured on each side of a personal vehicle and receives a first lane information and a second lane information from a vehicle located on a left side land a right side lane of the personal vehicle and a determining unit 30 configured to determine the lane location of the personal vehicle suing at least any one of the first lane information and the second lane information. Preferably, the receiver (not shown) comprises a first receiver 10 configured on a left side of the vehicle and receives a first lane information from a first vehicle located on the left side lane of the personal vehicle and a second receiver 20 configured on a right side of a personal vehicle and receives a second lane information from a second vehicle located on the right side lane of the personal vehicle.

The first receiver 10 is configured on the left side of a specific vehicle and receives the first lane information from the left side lane of the vehicle. In FIG. 1, the third vehicle 300 receives the lane information of the second vehicle 200 from the second vehicle 200 using the first receiver 10 formed on the third vehicle 300.

Herein, the lane information includes information regarding which lane each vehicle is located. In FIG. 1, the lane information that the second vehicle 200 is transmitting to a third vehicle 300 includes information that the second vehicle 200 is located on a second lane.

The lane information according to an embodiment of the present description may include location information of respective vehicles. Herein, location information of each vehicle may be GPS information collected using a GPS receiver. In that, each vehicle may determine a lane location more accurately by comparing location information of received lane information and location information of a personal vehicle. A method of determining lane location using the received location information may be applied with various signal management technology.

A communication method using the first receiver 10 according to an embodiment of the present description may apply with a short distance communication method including infrared ray communication method, Bluetooth® communication method and etc.

The infrared ray communication method has a disadvantage in that the communication possible distance is many meters. However, accordingly, security is maintained and direction may be provided when transmitting and receiving specific signal using a feature that transmitting module and receiving module of both side apparatus may have to face each other.

In other words, in FIG. 1, according to an embodiment of the present description, a communication method of transmitting and receiving each lane information is applied with an infrared communication method, a lane information that a second vehicle 200 transmitted to a third vehicle 300 of a right side direction is not transmitted to a first vehicle 100 or a fourth vehicle 400 and only transmitted to a third vehicle that is located within a predetermined distance to a right side of the second vehicle 200.

Further, according to an embodiment of the present description, a communication method of the first receiver 10 may be applied with a short distance communication method of a Bluetooth® communication method and etc. The first receiver unit 10 may receive lane information that is transmitted with a predetermined distance through the afore-mentioned method. The preferred embodiments of the invention have been explained so far is that a person skilled in the art will understand that the invention may be implemented in modifications without departing from the basic characteristics of the invention.

The second receiver 20 is configured on a right side of a specific vehicle and receives second lane information from a vehicle that is located on a right side lane of the vehicle. In FIG. 1, the third vehicle 300 may receive lane information of the fourth vehicle 400 from a fourth vehicle 400 using a second receiver 20 that is formed on the third vehicle 300.

Herein, the lane information includes information of which lane each vehicle is located. In FIG. 1, the information the fourth vehicle 400 is transmitting to a third vehicle 300 includes information that the fourth vehicle 400 is located on a fourth lane.

Hereinafter, feature relating to the second receiver 20 is identical with the first receiver 10, thereby omitted hereinafter.

The lane location determining unit 30 determines a lane location of the personal vehicle using at least any one of first lane information that is received through the first receiver 10, and second lane information that is received through the second receiver 20. The lane location determining unit 30 according to an embodiment of the present description determines a lane location in that the personal vehicle is located in a right side of the first lane information when a first lane information is received through the first receiver 10 and the personal vehicle is located on a left side lane of the second lane information when a second lane information through the second receiver 20.

In FIG. 1, the third vehicle 300 may receive lane information that that second vehicle 200 is located on a second lane from a second vehicle 200 through a first receiver 10. Herein, the lane location determining unit 30 can determine a lane location using the information that the third vehicle 300 is located on a third lane. Likewise, the lane location determining unit 30 may determine a lane location that the third vehicle 300 is located on a third lane using the information when the third vehicle 300 received a lane information that the fourth vehicle 400 is located on a fourth lane from a fourth vehicle 400 through the second receiver 20.

However, according to an embodiment of the present description, when determining a lane location of a personal vehicle using both first lane information and second lane information received through the first receiver 10 and a second receiver 20, the lane location determined using each information may be inconsistent with each other. Herein, according to an embodiment of the present description, the lane location determining unit 30 may determine that the personal vehicle is located on a right side lane of first lane information through first using the first lane information.

In other words, in FIG. 1, when a third vehicle receives information that the second vehicle 200 is located on a second lane from a second vehicle 200 and the fourth vehicle 400 receives information that the fourth vehicle 400 is located on a third lane from the fourth vehicle 400, accurate lane location of the third vehicle 300 cannot be determine when all the information is used. Herein, according to an embodiment of the present description, the third vehicle 300 may determine that the third vehicle 300 is located on the third lane that is the right side lane of the second vehicle 200 through first using lane information received from a second vehicle 200 that is located on the left side.

According to an embodiment of the present description, the lane location determining apparatus may further include a first transmitter 40 configured on the left side of the personal vehicle and transmits lane information of the personal vehicle to the third vehicle located on a left side vehicle of the personal vehicle; and a second transmitter 50 configured on a right side of the personal vehicle and transmits the lane information of the personal vehicle to the fourth vehicle that is located on the right side vehicle of the personal vehicle.

The first transmitter 40 is configured on the left side of the personal vehicle and may transmit lane information of the personal vehicle to the third vehicle located on a left side vehicle of the personal vehicle. That is, in FIG. 1, the third vehicle 300 may transmit lane information of the third vehicle 300 to the second vehicle 200 using the first transmitter 40.

Contrariwise, the second transmitter 50 is configured on a right side of the personal vehicle and may transmit the lane information of the personal vehicle to the fourth vehicle that is located on the right side vehicle of the personal vehicle. That is, the third vehicle 300 in FIG. 1 may transmit lane information of the third vehicle 300 to the fourth vehicle 400 using the second transmitter 50.

According to an embodiment of the present description, a communication method using the first transmitter 40 and the second transmitter 50 may be applied with a short distance communication method including an infrared ray communication method, Bluetooth® communication method and etc.

The particulars related to the afore-mentioned are illustrated through the first receiver 10, thereby omitted hereinafter.

Figure 3:
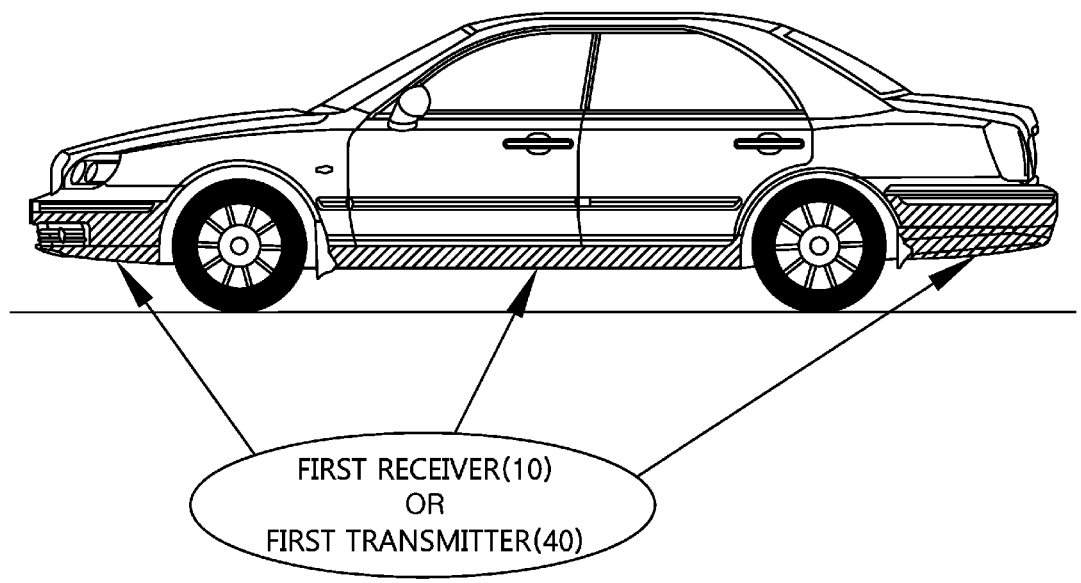
FIG. 3 is a block diagram of a first receiver and a first transmitter according to an embodiment of the present description.

FIG. 3 is a block diagram of a first receiver and a first transmitter 40 according to an embodiment of the present description.

As shown in FIG. 3, the first receiver 10 or the first transmitter 40 may be formed on a left side portion of a vehicle. FIG. 3 shows that the first receiver 10 or the first transmitter 40 is formed on a front side of a vehicle and rear side of a bumper and lower side portion of a vehicle, however this is an embodiment, thereby the present description is not limited to the embodiment. That is, according to an embodiment of the present description, the first receiver 10 or the first transmitter 40 may be formed in a proper location or form to transmit or receive lane information with a vehicle located on the left side or right side. A person with a general knowledge in a technical field of the present description may understand that the arrangement form of the first receiver 10 or the first transmitter 40 may be formed changed within a range of the original feature of the present description.

Further, the lane location determining unit 30 according to an embodiment of the present description may determine that the personal vehicle is located on a left side or right side lane of previous lane information when determined that the lane moved to a left side or right side lane using steering information of the personal vehicle. For example, when the personal vehicle is determined that a steering angle of over certain angle is maintained for a certain time using a steering angle information of a personal vehicle that is collected through CAN (Controller Access Network), LIN (Local interconnect Network), IVN (In-Vehicle Network) and etc. of a vehicle, the lane location determining unit 30 may determine that the vehicle moved to a left side or right side lane using the information. Herein, the lane location determining unit 30 may revise the lane location information to a left side or right side lane comparing to a previous lane information responding to each case of when determined that the vehicle moved to a left side lane or a right side lane.

Herein, according to an embodiment of the present description, when lane location information is changed, the personal vehicle may transmit lane location information that is changed using the first transmitter 40 and the second transmitter 50 to a surrounding vehicle.

According to an embodiment of the present description, the lane location determining apparatus may further include a center line detecting unit 60 configured to detect a center line using a lane detecting sensor, and the lane location determining unit 30 may determine that the personal vehicle is located on a first lane using the centerline detecting information when a centerline is detected through the centerline detecting unit 60.

That is, in FIG. 1, the first vehicle 100 may detect a centerline using the centerline detecting unit 60 and herein, the lane location detecting unit 30 of the first vehicle 100 may determine that the first vehicle 100 is located on the first lane.

Herein, the first vehicle 100 according to an embodiment of the present description can transmit the lane location information of the first lane 100 to a second vehicle 200 that is located on the right side. Thereby, the second vehicle 200 may be determined to be located on a current second lane.

The centerline detecting unit 60 may detect a left line of the personal vehicle. More particularly, the centerline detecting unit 60 may detect a centerline through whether a left line of the personal vehicle is yellow for over a predetermined time.

In Korea, all vehicles drive on the right side, thereby a centerline of a road is always located on a left side of the vehicle. Thus, the lane detecting sensor may detect a centerline by detecting lane line of a vehicle. Specifically, according to Road Traffic Act regulation, a center line includes a line displayed with a yellow line or yellow dot line and etc. (Road traffic Act Article 2 4 number 2), thereby, the center line detecting unit 60 according to an embodiment of the present description may detect the center line through the left line of the personal vehicle is yellow for over a certain time.

Further, according to an embodiment of the present description, the road line detecting sensor is applied with a camera and the center line detecting unit 60 can detect a center line through an image management of an image information that is collected using the camera censor. More particularly, the center line detecting unit 60 can extract centerline information in the image information by implementing image management regarding the image information that is received through the image information. Herein, various image management technologies can be applied as a method of extracting the centerline information.

The preferred embodiments of the invention have been explained so far. a person skilled in the art will understand that the invention may be implemented in modifications without departing from the basic characteristics of the invention. Accordingly, the foregoing exemplary embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims.

What is claimed is:

1. An apparatus for determining lane position through inter-vehicle communication comprising:
    a receiver configured on both sides of a personal vehicle to receive a first lane information and a second lane information from the left and right side lane of the personal vehicle and,
    a lane location determining unit configured to determine a lane location of the personal vehicle using at least one of the first lane and second lane information, and a centerline detector configured to detect a centerline using a lane detecting sensor,
        wherein the lane location determining unit additionally determines that the personal vehicle is located on a first lane using the centerline detecting information.

2. The apparatus for determining lane position through inter-vehicle communication of claim 1, wherein the receiver comprising:
    a first receiver configured on the left side of the personal vehicle to receive the first lane information from the first vehicle that is located on the left side lane of the personal vehicle, and
    a second receiver configured on a right side of the personal vehicle to receive a second lane information from a second vehicle that is located on a right side lane of the personal vehicle.

3. The apparatus for determining lane position through inter-vehicle communication of claim 2, wherein the lane location determining unit determines a lane location in that when a first lane information is received through the first receiver, the personal vehicle is located on a right side lane of the first lane information and when a second lane information is received through the second receiver, the personal vehicle is located on a left side lane of the second lane information.

4. The apparatus for determining lane position through inter-vehicle communication of claim 3, wherein the lane location determining unit determines that the personal vehicle is located on a right side lane of the first lane information when the lane locations of the personal vehicle that are determined using the first lane information and the second lane information are inconsistent therebetween.

5. The apparatus for determining lane position through inter-vehicle communication of claim 2, further comprising:
    a first transmitter configured on the left side of the personal vehicle and transmits a lane information of the personal vehicle to a third vehicle located on a left side lane of the personal vehicle and
    a second transmitter configured on a right side of the personal vehicle to transmit the lane information of the personal vehicle to a right side lane of the personal vehicle.

6. The apparatus for determining lane position through inter-vehicle communication of claim 5, wherein the lane location determining unit determines the personal vehicle is located on a left side or right side lane of a previous lane information when determined that the lane is moved to a left side or right side lane using a steering information of the personal vehicle.

7. The apparatus for determining lane position through inter-vehicle communication of claim 5, wherein the first and second receiver and the first and second transmitter receive or transmit related lane information through a short communication method including an infrared ray communication method and a Bluetooth® communication method.

8. The apparatus for determining lane position through inter-vehicle communication of claim 1, wherein the lane detecting sensor is applied with a camera sensor and the centerline detecting unit detects the centerline through an image management of an image information that is collected using the camera sensor.

9. The apparatus for determining lane position through inter-vehicle communication of claim 1, further comprising:
a second transmitter configured on a right side of the personal vehicle, transmits lane information of the personal vehicle to a fifth vehicle that is located on a right side vehicle of the personal vehicle when a centerline is detected through the centerline detector.

10. The apparatus for determining lane position through inter-vehicle communication of claim 1, wherein the centerline detecting unit detects a left side lane of the personal vehicle.

11. The apparatus for determining lane position through inter-vehicle communication of claim 10, wherein the centerline detecting unit detects the center line through whether a left side lane of the personal vehicle is yellow for over a predetermined time.

* * * * *